US011408404B2

(12) United States Patent
Buckley et al.

(10) Patent No.: US 11,408,404 B2
(45) Date of Patent: Aug. 9, 2022

(54) ELECTRIC DRIVE PUMP FOR WELL STIMULATION

(71) Applicant: ST9 Gas and Oil, LLC, The Woodlands, TX (US)

(72) Inventors: Christopher Paul Buckley, Montgomery, TX (US); Brian Boguski, Milford, OH (US)

(73) Assignee: ST9 Gas and Oil, LLC, The Woodlands, TX (US)

( * ) Notice: Subject to any disclaimer, the term of this patent is extended or adjusted under 35 U.S.C. 154(b) by 0 days.

(21) Appl. No.: 17/657,483

(22) Filed: Mar. 31, 2022

(65) Prior Publication Data

US 2022/0220949 A1 Jul. 14, 2022

Related U.S. Application Data

(62) Division of application No. 16/683,057, filed on Nov. 13, 2019, now Pat. No. 11,313,359.

(Continued)

(51) Int. Cl.
*F04B 17/03* (2006.01)
*F04B 15/02* (2006.01)
(Continued)

(52) U.S. Cl.
CPC .............. *F04B 17/03* (2013.01); *E21B 43/26* (2013.01); *E21B 43/2607* (2020.05); *F04B 9/02* (2013.01);
(Continued)

(58) Field of Classification Search
CPC ........ E21B 43/26; E21B 43/2607; F04B 9/02; F04B 15/02; F04B 17/03; F04B 53/006;
(Continued)

(56) References Cited

U.S. PATENT DOCUMENTS 8,083,504 B2 * 12/2011 Williams ................ F04B 15/02
417/523
10,598,258 B2 * 3/2020 Oehring .................. F04B 15/02
(Continued)

FOREIGN PATENT DOCUMENTS

| CN | 109882144 A | 6/2019 |
| WO | WO 2019060922 A1 | 3/2019 |
| WO | WO 2019204323 A1 | 10/2019 |

OTHER PUBLICATIONS

United States Patent and Trademark Office, International Search Report and Written Opinion, PCT/US2020/053499, dated Feb. 5, 2021, 14 pages, United States of America.

*Primary Examiner* — Peter J Bertheaud
(74) *Attorney, Agent, or Firm* — Haynes and Boone, LLP

(57) ABSTRACT

An electric drive hydraulic fracturing pump system includes one or more electric motors, with each electric motor electrically coupled to a dedicated dual inverter to control operation of the motor. A plurality of electric motors may be coupled to each end of a pump crankshaft and configured to provide rotational power to the power end of a hydraulic fracturing pump through a planetary gearset coupled to each end of the crankshaft. A hydraulic cooling circuit having a first and second cooling systems may be used to regulate the temperature of the electric motors and dual inverters.

6 Claims, 9 Drawing Sheets

Related U.S. Application Data

(60) Provisional application No. 62/909,082, filed on Oct. 1, 2019.

(51) Int. Cl.
*H02K 11/33* (2016.01)
*E21B 43/26* (2006.01)
*F04B 49/06* (2006.01)
*F04B 53/00* (2006.01)
*F04B 9/02* (2006.01)
*F04B 47/02* (2006.01)

(52) U.S. Cl.
CPC .............. *F04B 15/02* (2013.01); *F04B 47/02* (2013.01); *F04B 49/06* (2013.01); *F04B 49/065* (2013.01); *F04B 53/006* (2013.01); *H02K 11/33* (2016.01)

(58) Field of Classification Search
CPC ........ F04B 49/06; F04B 49/065; F04B 47/02; H02K 11/33
See application file for complete search history.

(56) References Cited

U.S. PATENT DOCUMENTS

| | | | |
|---|---|---|---|
| 11,168,681 B2 * | 11/2021 | Boguski | F04B 53/006 |
| 11,313,359 B2 * | 4/2022 | Buckley | H02K 9/19 |
| 11,339,769 B2 * | 5/2022 | Buckley | F04B 17/03 |
| 2004/0219040 A1 * | 11/2004 | Kugelev | F04B 17/03 417/415 |
| 2007/0041849 A1 * | 2/2007 | Allen | F04B 49/126 417/273 |
| 2019/0169971 A1 | 6/2019 | Oehring et al. | |

* cited by examiner

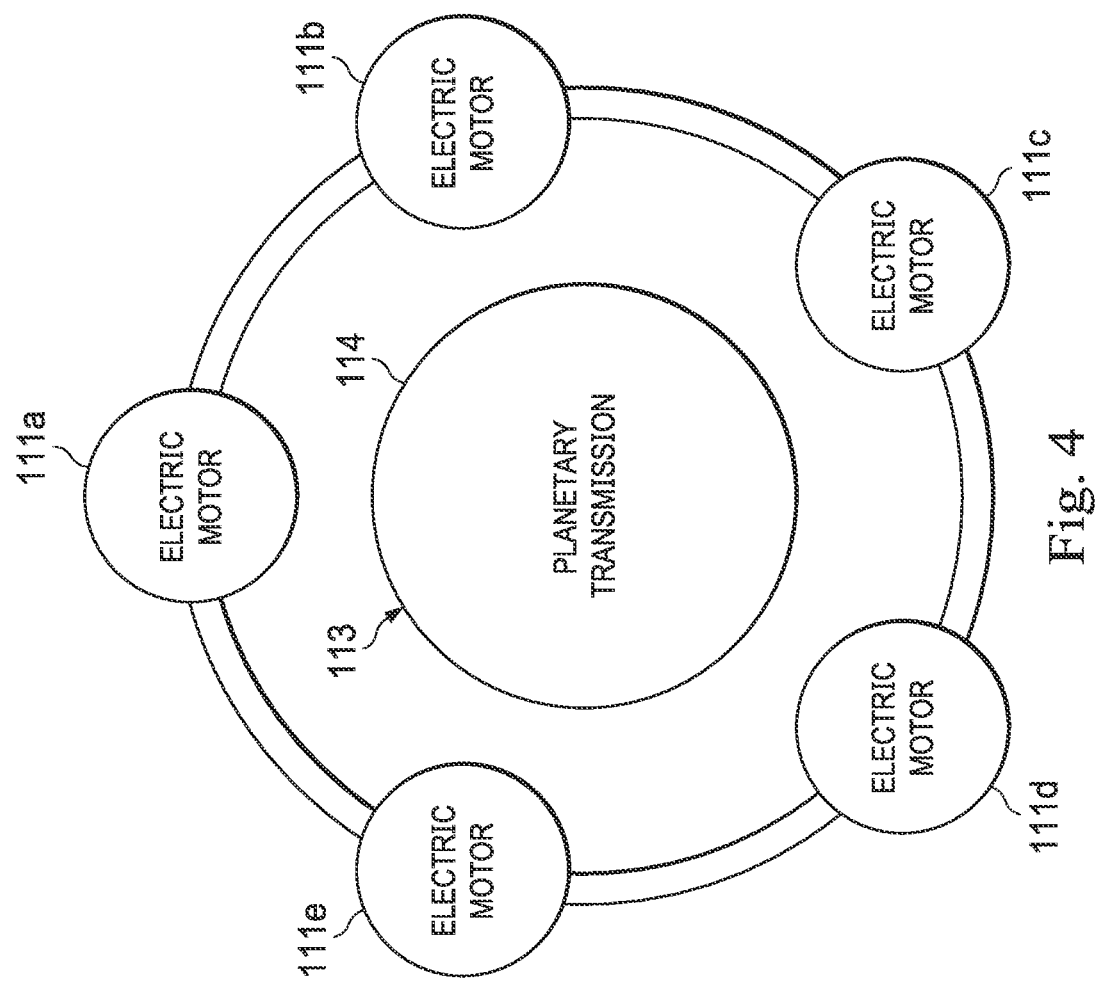

ELECTRIC DRIVE PUMP FOR WELL STIMULATION

PRIORITY

The present application claims priority to U.S. Non-Provisional application Ser. No. 16/683,057, filed Nov. 13, 2019, which claims priority to U.S. Provisional Application No. 62/909,082, filed Oct. 1, 2019, the benefit of which is claimed and the disclosures of which are incorporated herein by reference in their entirety.

TECHNICAL FIELD

The present application relates generally to hydraulic fracturing in oil and gas wells, and in particular to an electric drive pump used to drive a fluid end for the pumping of a fracturing fluid into a well.

BACKGROUND

It is difficult to economically produce hydrocarbons from low permeability reservoir rocks. Oil and gas production rates are often boosted by hydraulic fracturing, a technique that increases rock permeability by opening channels through which hydrocarbons can flow to recovery wells. Hydraulic fracturing has been used for decades to stimulate production from conventional oil and gas wells. The practice consists of pumping fluid into a wellbore at high pressure (sometimes as high as 50,000 PSI). Inside the wellbore, large quantities of proppants are carried in suspension by the fracture fluid into the fractures. When the fluid enters the formation, it fractures, or creates fissures, in the formation. Water, as well as other fluids, and some solid proppants, are then pumped into the fissures to stimulate the release of oil and gas from the formation. When the pressure is released, the fractures partially close on the proppants, leaving channels for oil and gas to flow.

Fracturing rock in a formation requires that the fracture fluid be pumped into the well bore at very high pressure. This pumping is typically performed by high pressure, hydraulic fracturing pumps, with a diesel engine used to power operation of the pump to deliver fracture fluids at sufficiently high rates and pressures to complete a hydraulic fracturing procedure or "frac job." While such hydraulic fracturing pumps are able to pump fracturing fluid into a well bore at a high enough pressure to crack the formation, they also have drawbacks. For example, the diesel powered pump systems are very heavy, and thus must be moved on heavy duty trailers, making transport of the pump systems between oilfield sites expensive and inefficient. In addition, the diesel engines required to drive such pumps require a relatively high level of expensive maintenance. Furthermore, the cost of diesel fuel is much higher than in the past, meaning that the cost of running the pump systems has increased.

To avoid the disadvantages of diesel-powered hydraulic fracturing pump systems, electrically powered hydraulic fracturing pump systems have been proposed. Some prior art systems offer a dual electric motor configuration coupled to one or two triplex pumps. This large, industrial-sized, and air-cooled hydraulic fracturing pump system can be capable of 3600-4500 hydraulic horsepower (HHP). Other prior art systems employ a single electric motor configuration, wherein a centrally located motor is connected by two quintuplex pumps via a through-spindle design. This larger prior art hydraulic fracturing pump system is also air-cooled, and is capable of 6000 HHP. Existing prior art electric configurations experience inefficiencies in certain key areas. Contemporary offerings for electric frac configurations are composed of existing components from mechanical systems that are repurposed for electric applications. These components were not specifically built for electric systems. Consequently, effective horsepower is decreased due to design conflicts introducing hydraulic and mechanical resistance, as well as accelerated wear cycles as a result of violent harmonics and misalignments in provisional electric systems.

Additionally, the inefficiencies stem from the fact that air-cooling solutions often are not capable of regulating the temperatures of these large electric motor systems, especially in environments where heat is a special concern. This leads to motors running hotter, and therefore, far less efficiently, which reduces the effective hydraulic horsepower of the entire hydraulic fracturing pump system. The inability to regulate running temperatures can also lead to premature failure.

There are other concerns regarding the integration of existing mechanical components and electric motors, such as the optimization of the ratios used by power end reduction gears. Electric motors are often mistakenly considered to produce the same results at any RPM. Even though they have flatter and more consistent torque and power curves than internal combustion solutions, this is not entirely true. Electric motors do perform best within a certain RPM range, and contemporary offerings have not taken full advantage of the optimization that understanding provides. Reduction gear ratios that were not chosen for use in a specific electrical application expose motors that drive them to possible premature failure, whether it be from spinning outside of the optimal range or introducing harmonic imbalances and damaging the powertrain as a whole.

Although great strides have been made with respect to the power end of a fracturing pump system, there clearly is room left for improvement in electric drive pump fracking systems.

BRIEF DESCRIPTION OF THE DRAWINGS

For a more complete understanding of the present disclosure and its features and advantages, reference is now made to the following description, taken in conjunction with the accompanying drawings, in which:

FIG. 1b is a schematic illustration of the overall architecture of the electric hydraulic fracturing pump system of FIG. 1a;

FIG. 4 is a is a schematic illustration of one embodiment of a power transmission system of the electric hydraulic fracturing pump system;

FIG. 5b is an alternative perspective view of the electric hydraulic fracturing pump system of FIG. 5a;

FIG. 6b is an end view of the electric hydraulic fracturing pump system of FIG. 6a.

FIG. 6c is an alternative perspective view of the electric hydraulic fracturing pump system of FIG. 6a.

DETAILED DESCRIPTION

Figure 1A:
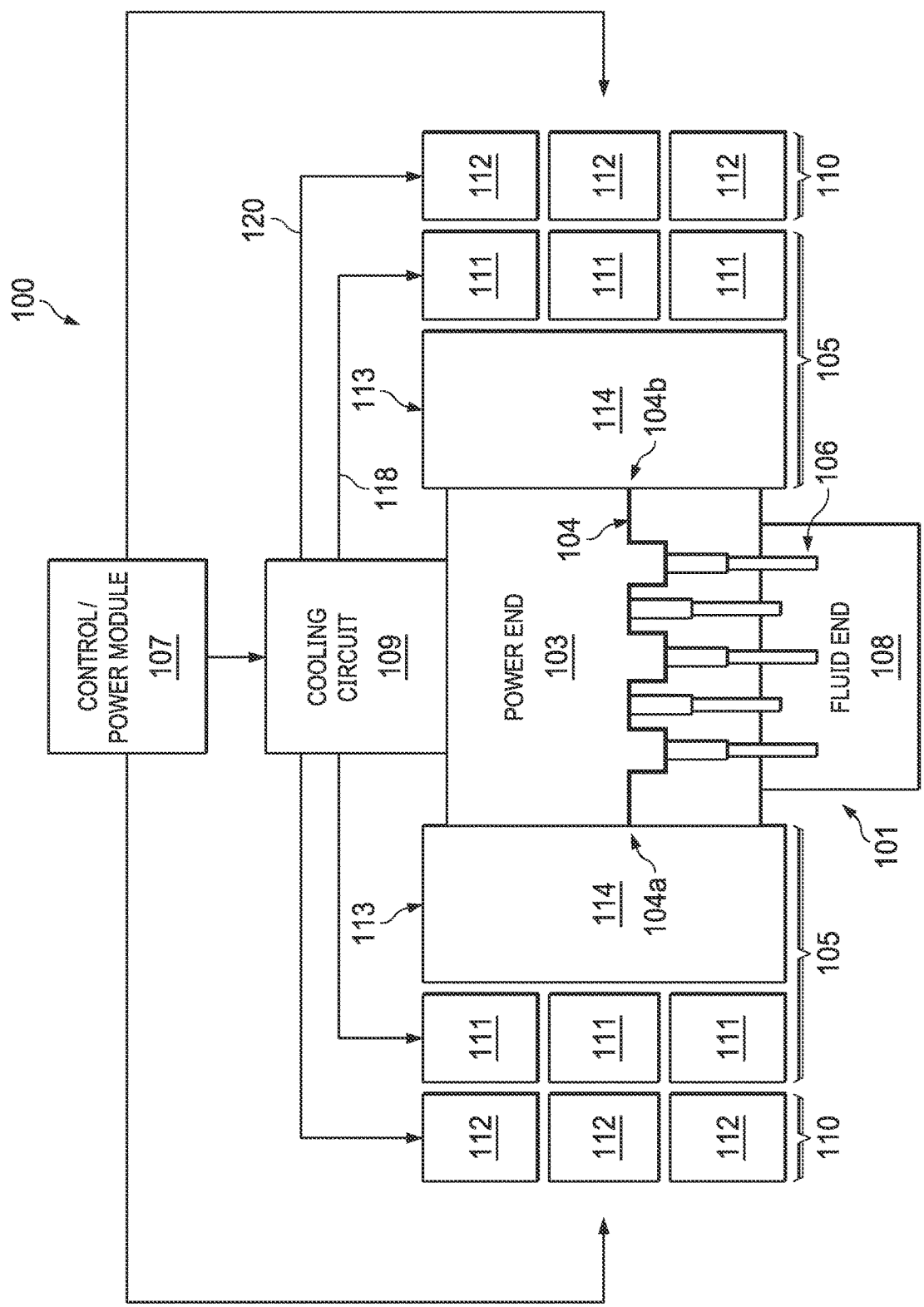
FIG. 1a is a schematic illustration of an electric hydraulic fracturing pump systems according to embodiments of the present disclosure.

It is an object of the present application to provide an electric hydraulic fracturing drive pump system for use in well stimulation. The electric hydraulic fracturing drive pump system is configured to provide a plurality of individual motors and individual dual inverters in selective configurations that work together to provide power to a power end. Each electric motor is controlled by its own dual inverter. The electric motors are coupled to a gearbox which is used to convert the rotary motion of the electric motors into linear motion for operation of the plungers in the fluid ends of hydraulic fracturing pumps. Each dual inverter is utilized to convert a DC power signal from a power source into an AC signal, and thereafter, applies pulse width modulation to the AC signal to control flow and torque of its associated electric motor. The electric hydraulic fracturing drive pump system includes a transmission assembly that is composed of the gearbox and the plurality of electric motors. The transmission assembly is attachable to any power end and is operable with legacy power ends.

Because of the amount of heat generated by the dual inverters, as well as the electric motors, a cooling circuit having parallel dual cooling systems, with one cooling system regulating temperature of the motors and the other cooling system regulating temperature of the dual inverters.

The system in accordance with the present application overcomes one or more problems commonly associated with conventional pumps used to stimulate a well. The electric drive pump system of the present application is configured to incorporate a plurality of electric motors to the power end or pump portion of a pump system and a corresponding number of dual inverters, where each dual inverter controls a separate electric motor. The motors are configured to operate either collectively or independently to vary the power supplied to the power end. The electric motors may operate in any combined manner and may operate in any sequential order. The individual dual inverters control torque of their related motors to regulate power output of each motor. By including smaller motors, the motors are more easily obtained in the market, precise power requirements may be met smoothly, and overall power consumption may be minimized.

Referring to FIG. 1 in the drawings, a schematic of an electric drive hydraulic fracturing pump system 100 for well stimulation through a power end is provided. The electric drive hydraulic fracturing pump system 100 includes a hydraulic fracking pump 101 having a power end and a fluid end 108, a transmission assembly 105, a control module 107, a dual inverter assembly 110 and a temperature regulation circuit 109. Power end 103 is configured to convert, via a crankshaft 104, the rotational/rotary motion generated through transmission assembly 105 into a linear motion for operation of plungers 106 within one or more fluid ends 108. Power end may operate with any number of fluid ends 108 of hydraulic fracturing pumps 101 and may be constructed from a casting or fabricated from one or more materials. In one or more embodiments, the crankshaft 104 extends between a first end 104a and a second end 104b with a transmission assembly 105 directly coupled to each end 104a, 104b of crankshaft 104 in order to balance torque applied to crankshaft 104 and maximize power input.

Transmission assembly 105 may be releasably mounted to power end 103 of pump 101. In one or more embodiments, transmission assembly 105 includes at least one electric motor 111 electrically coupled to dual inverter assembly 110 having at least one dual inverter 112. In other embodiments, transmission assembly 105 includes at least two, and in some embodiments, a plurality of electric motors 111 and a gearbox 113 in communication with the two or more electric motors 111. In one or more embodiments, a transmission assembly 105 is coupled to each end of crankshaft 104 and each transmission assembly 105 includes at least one electric motor 111 electrically coupled to its own dual inverter 112. In some embodiments, each transmission assembly 105 includes at least three spaced apart electric motors 111, each electrically coupled to its own dual inverter 112. Thus, in some embodiments, three or more electric motors 111 may be coupled to each end of the crankshaft. In some embodiments, each transmission assembly 105 includes at least five electric motors 111 spaced apart about the axis of the crankshaft 104 each of the electric motors 111 electrically coupled to its own dual inverter 112. In one or more embodiments, the transmission assembly 105 coupled to each end of the crankshaft 104 has the same number of electric motors 111.

Gearbox 113 includes a gearset 114 for transferring rotational energy from the two or more electric motors 111 of a transmission assembly 105 to the power end 103. Although the disclosure is not intended to be limited to a particular arrangement of gearset 114, in one or more embodiments, gearset 114 includes at least one planetary gearset coupled to crankshaft 104. Such a planetary gearset 114 permits each individual electric motor 111 to be spaced apart from the axis of the crankshaft 104. In some embodiments, gearset 114 includes a bull gear attached to crankshaft 104 and a plurality of separate planetary gearsets coupled to the bull gear, where each of the planetary gearsets is coupled to a separate electric motor 111. In other words, each electric motor 111 drives a separate planetary gearset, and each of the separate planetary gearsets is then coupled to the bull gear. As used herein, the term "coupled" may include both direct attachment as well as meshed with a gear via one or more other gears.

Although dual inverter assembly 110 need not be, in one or more embodiments, dual inverter assembly 110 is mounted adjacent transmission assembly 105 about the axis of crankshaft 104. In this regard in one or more embodiments, a dual inverter 112 may be mounted directly to its corresponding electric motor 111 in order to minimize the footprint of electric drive hydraulic fracturing pump system 100 since space at a well site is limited. In one or more embodiments, dual inverter assembly 110 includes at least two, and in some embodiments, a plurality of dual inverters 112, each dual inverter 112 electrically coupled to a separate electric motor 111. In one or more embodiments, a dual inverter assembly 110 is mounted at each end of crankshaft 104 and each dual inverter assembly 110 includes at least two dual inverters. In some embodiments, each dual inverter assembly 110 includes at least three spaced apart dual inverters 112. In some embodiments, each dual inverter assembly 110 includes at least five dual inverters spaced apart about the axis of the crankshaft 104. In one or more embodiments, the dual inverter assembly 110 coupled to each end of the crankshaft 104 has the same number of dual inverters 112.

Electric drive hydraulic fracturing pump system 100 may also include a control module configured to regulate performance of transmission assembly 105 and dual inverter assembly 110. Electrical power is provided by dual inverter assembly 110 to electric motors 111, which in turn are used to induce a torque of selected power to rotate gearset 114 within gearbox 113. Control module 107 is used to monitor the performance of each electric motor 111 and each dual inverter 112, and control selected functions of each electric motor 111, such as power output, speed, on/off, unit temperature, and so forth via each motor's corresponding dual inverter 112. It is understood that these are exemplary in nature and do not form an exhaustive listing of performance characteristics or functions that module 107 may regulate with respect to electric motors 111 dual inverters 112 or electric drive hydraulic fracturing pump system 100. Thus, in one or more embodiments, control module 107 may also be utilized to control a temperature regulation circuit having a first cooling system 118 and a second cooling system 120. Through control module 107, electric motors 111 and dual inverters 112 can be controlled simultaneously as a group at selected power levels as desired and/or individually wherein each electric motor 111 and each corresponding dual inverter 112 is independent of the operation of other electric motors 111 and dual inverters 112 with respect to at least torque, power output and runtime. Use of a plurality of electric motors 111 and dual inverters 112 allows for simplification of maintenance since one or more electric motor 111-dual inverter 112 pairs may be selectively deenergized for maintenance while others electric motor 111-dual inverter 112 pairs remain energized for operation of power end 103.

Figure 1B:
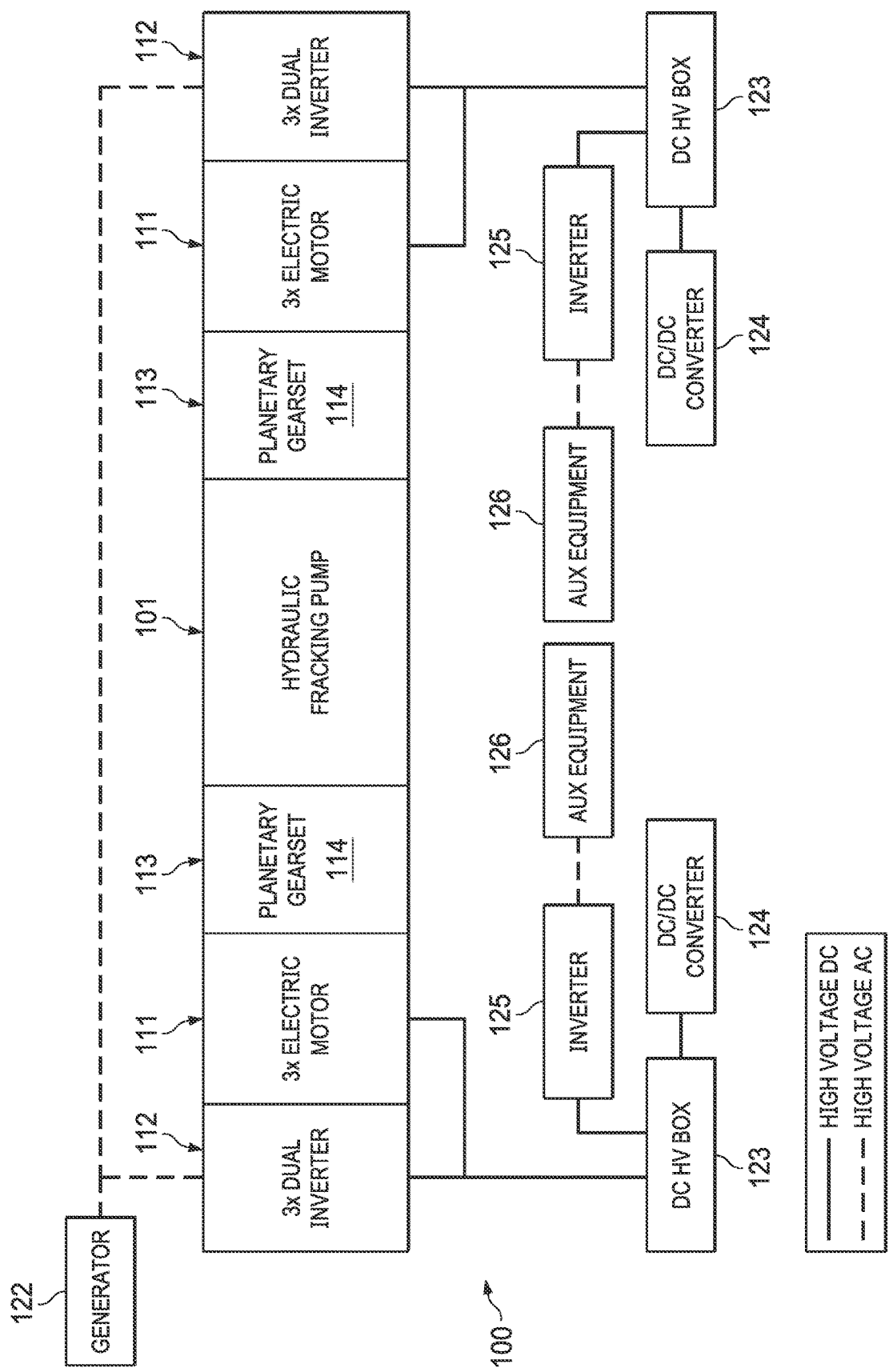

In one or more embodiments, dual inverters 112 may be provided with power from a power source 122, such as the generator shown in FIG. 1b. In other embodiments, power source 122 may be battery stacks or direct feed from a main power grid.

As seen in FIGS. 1a and 1b, either one or two transmission assemblies 105 may be coupled to drive power end 103. Electric motors 111 of transmission assemblies 105 can be configured to operate in a clock-wise (CW) direction or a counter clock-wise (CCW) direction so as to collectively rotate in the same direction relative to power end 103. Although electric motors 111 may be arranged in any manner within transmission assembly 105, in one or more embodiments, electric motors 111 may be symmetrically spaced about the axis of crankshaft 104. One or more electric motor 111 may be in direct communication with the gearset 114 of gearbox 113, which is directly coupled to crankshaft 104.

Temperature regulation circuit 109 is configured to regulate the temperature levels of various components of electric drive hydraulic fracturing pump system 100, particularly the electric motors 111 and the dual inverters 112. In one or more embodiments, temperature regulation circuit 109 is a cooling circuit having a first cooling system 118 disposed to cool electric motors 111 and a second cooling system 120 disposed to cool dual inverters 112. First cooling system 118 circulates a first coolant fluid while second cooling system 120 circulates a second coolant fluid. In one or more embodiments first coolant fluid is a synthetic coolant and second coolant is a mixture of water and glycol.

Figure 2:
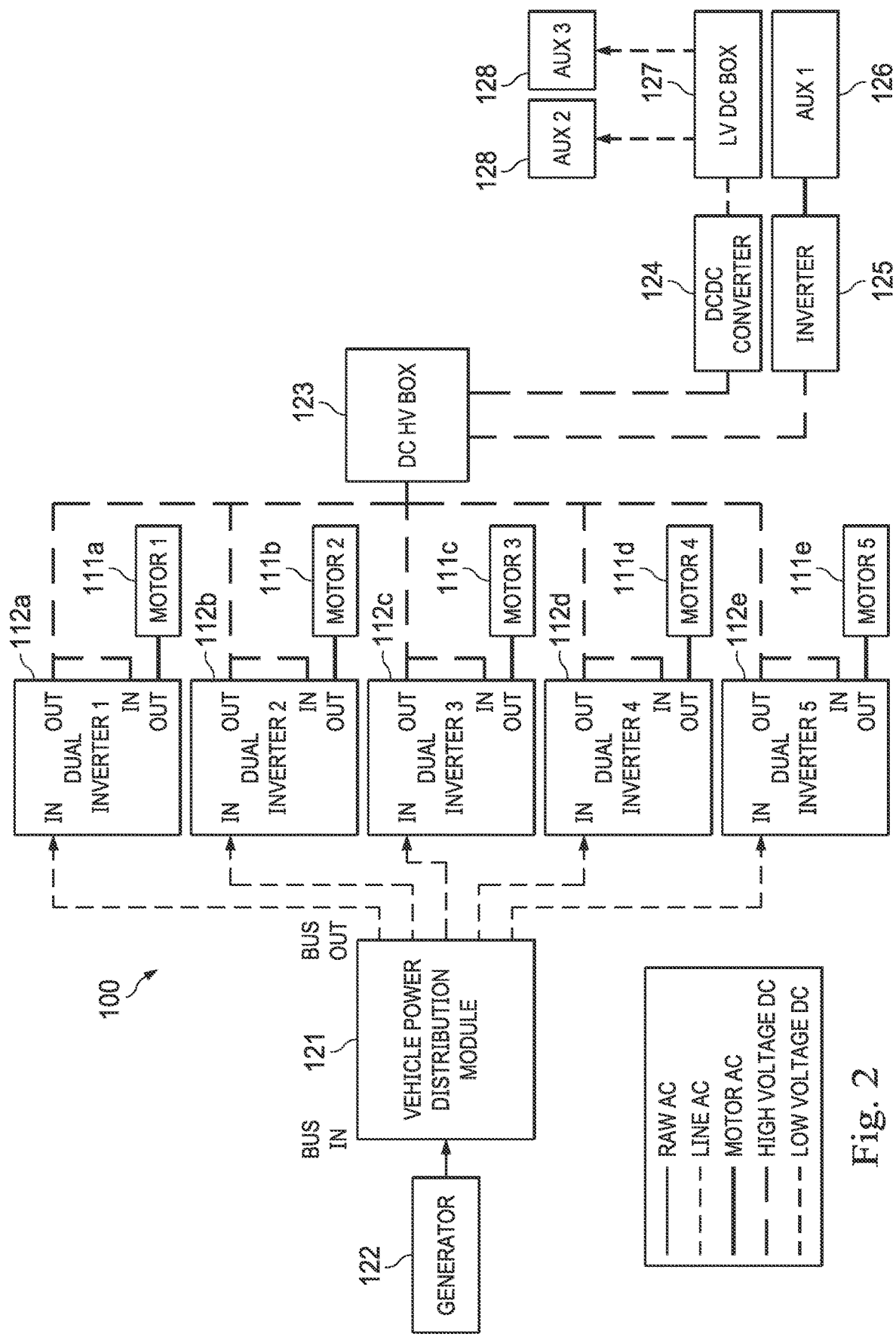
FIG. 2 is a schematic illustration of the electrical architecture of an electric hydraulic fracturing pump system.

With reference to FIG. 2, each dual inverter 112 may include an AC terminal for receiving an alternating current (AC) signal from a power distribution module 121 electrically coupled to power source 122. In FIG. 2, five electric motors 111a-111e are illustrated, along with corresponding dual inverters 112a-112e. In this regard, the power distribution module 121 may be disposed to receive an AC signal from power source 122. In any event, each dual inverter 112a-112e includes a high voltage direct current (DC) terminal for transmitting the converted AC signal. A first line out from the high voltage DC terminal may be electrically coupled to one or more converters 124 to convert the high voltage DC signal to a low voltage DC signal for driving one or more auxiliary electrical components 128, such as fans or pumps. In one or more embodiments, the low voltage DC signal from converter 124 may be directed through a low voltage DC splitter 112 to a plurality of auxiliary components 128. The first line out from the high voltage DC terminal may be electrically coupled to one or more inverters 125 to convert the high voltage DC signal to an AC signal for driving one or more auxiliary electrical components 126, such an oil motor. With reference to FIGS. 1b and 2, the first line out from the high voltage DC terminal may be directed through a high voltage DC splitter 123 to a plurality of inverters 125, a plurality of converters 124, or to at least one inverter 125 and at least one converter 124. In some embodiments, at least one high voltage DC splitter 123 may be supplied on each end of the crankshaft 104. In one or more embodiments, the high voltage DC splitter 123 may further include one or more inductor, capacitor, transformer, switch, DC filter, and/or regulator. A second line out from the high voltage direct current terminal may be pulse width modulated by the dual inverter 112 to produce a modulated AC signal for a corresponding electric motor 111.

Figure 3:
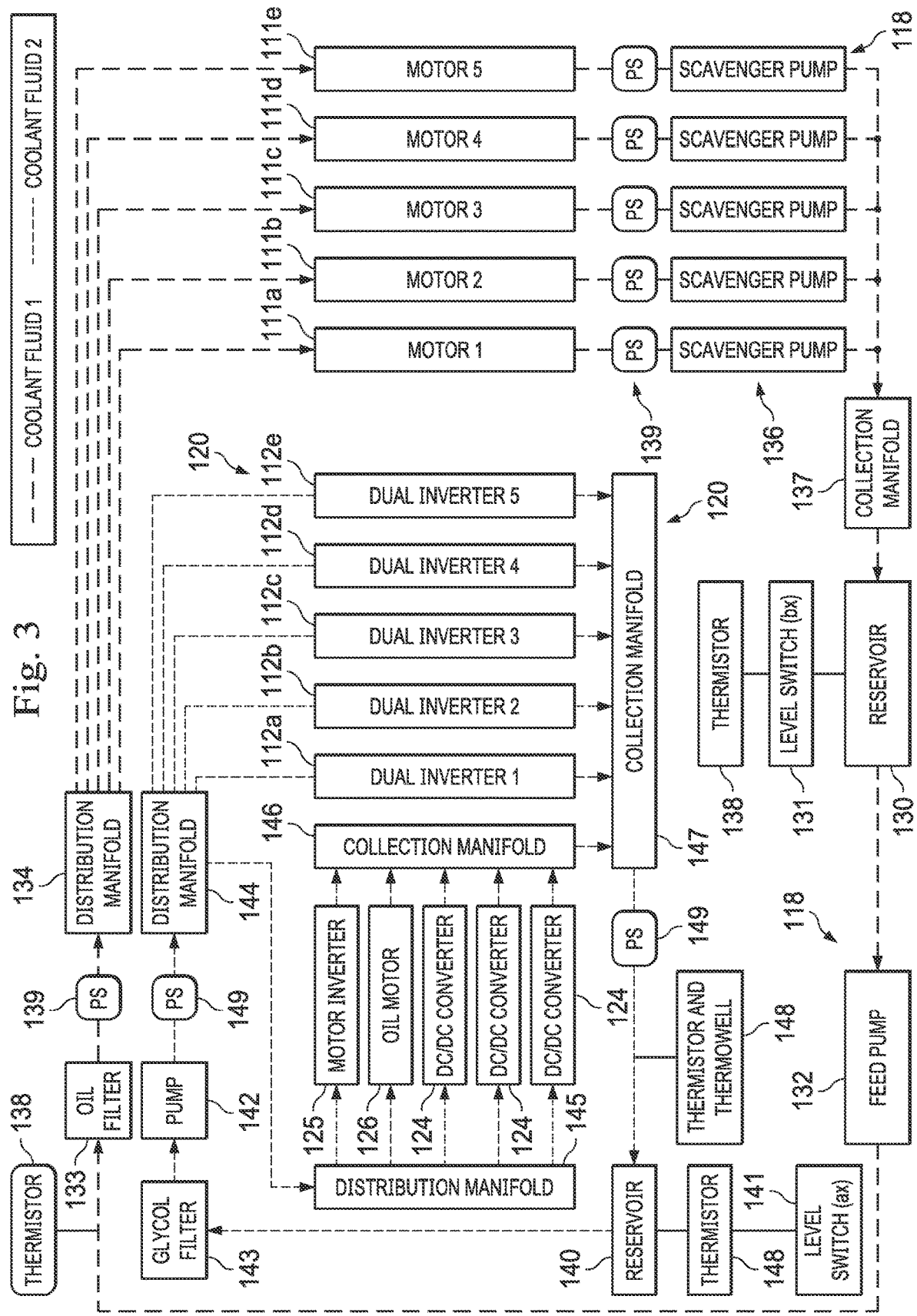
FIG. 3 is a schematic illustration of the cooling circuit architecture of an electric hydraulic fracturing pump system of FIG. 2.

With reference to FIG. 3, a first cooling system 118 is disposed to cool electric motors 111. In FIG. 3, five electric motors 111a-111e are illustrated. Each electric motor 111 may include an associated scavenger pump 136, such as referenced above as auxiliary equipment, to pump the first coolant from its electric motor 111 into a collection manifold 137 that is in fluid communication with a first coolant reservoir 130. In one or more embodiments, the first coolant reservoir 130 includes a level switch system 131 for monitoring and/or controlling the levels of the first coolant in the first coolant reservoir. In some embodiments, the first coolant is oil. A feed pump 132 may be utilized to draw the first coolant from the first coolant reservoir 130 and inject the coolant from the first coolant reservoir 130 back to an electric motor 111. A distribution manifold 134 may be employed to direct the first coolant to a plurality of electric motors 111. The first cooling system 118 may include one or more sensors. The sensors may include, but are not limited to, a temperature sensor 138, such as a thermistor, and a pressure sensor 139. In any embodiment, the temperature sensor 138 may be disposed in a thermowell. In any embodiment, the first cooling system 118 may include one or more filters 133 for filtering the first coolant.

The second cooling system 120 may be utilized to cool dual inverters 112. In FIG. 3, five dual inverters 112a-112e are illustrated. The second coolant is pumped from a second coolant reservoir 140 by a second coolant pump 142 and supplied to a distribution manifold 144 that supplies the second coolant to each of the dual inverters 112a-112e. In one or more embodiments, the second coolant reservoir 140 includes a level switch system 141 for monitoring and/or controlling the levels of the first coolant in the first coolant reservoir. In some embodiments, the second coolant is a mixture of water and glycol. In addition, the distribution manifold 144 may supply the second coolant through an auxiliary distribution manifold 145 to one or more converters 124, inverters 125, and/or auxiliary components 126, as illustrated. The second coolant may be collected from such auxiliary equipment through an auxiliary collection manifold 146. A collection manifold 147 may be employed to collect the second coolant from the dual inverters 112a-112e and the auxiliary collection manifold. Although the auxiliary distribution and collection manifolds 145, 146 are illustrated as part of the second cooling system 120, in one or more embodiments, these components may be included only in the first cooling system 118 and, in other embodiments, each of the first and second cooling systems 118, 120 includes these components. As with the first cooling system 118 above, the second cooling system 120 may include one or more sensors. The sensors may include, but are not limited to, a temperature sensor 148, such as a thermistor, and a pressure sensor 149. In any embodiment, the temperature sensor may be disposed in a thermowell. In any embodiment, the second cooling system 120 may include one or more filters 143 for filtering the first coolant. It will be appreciated that the pulse width modulation performed by the dual inverters 112 generates a particularly large amount of heat, and that the second cooling system 120 is desirable to maintain the temperature of dual inverters 112a-112e at preferred operating temperatures.

Persons of ordinary skill in the art will appreciate that while it is not shown, one or more heat transfer mechanisms may be utilized to remove heat from the first coolant and second coolant as is well known in the art.

Referring to FIG. 4, a plurality of electric motors 111a-111e may be spaced around a central gearbox 113 including a gearset 114. Although five electric motors 111a-111e are illustrated, the number of electric motors 111 is not so limited. Electric motors 111a-111e may be evenly spaced about the gearset 114, as shown in FIG. 4.

Figure 5A:
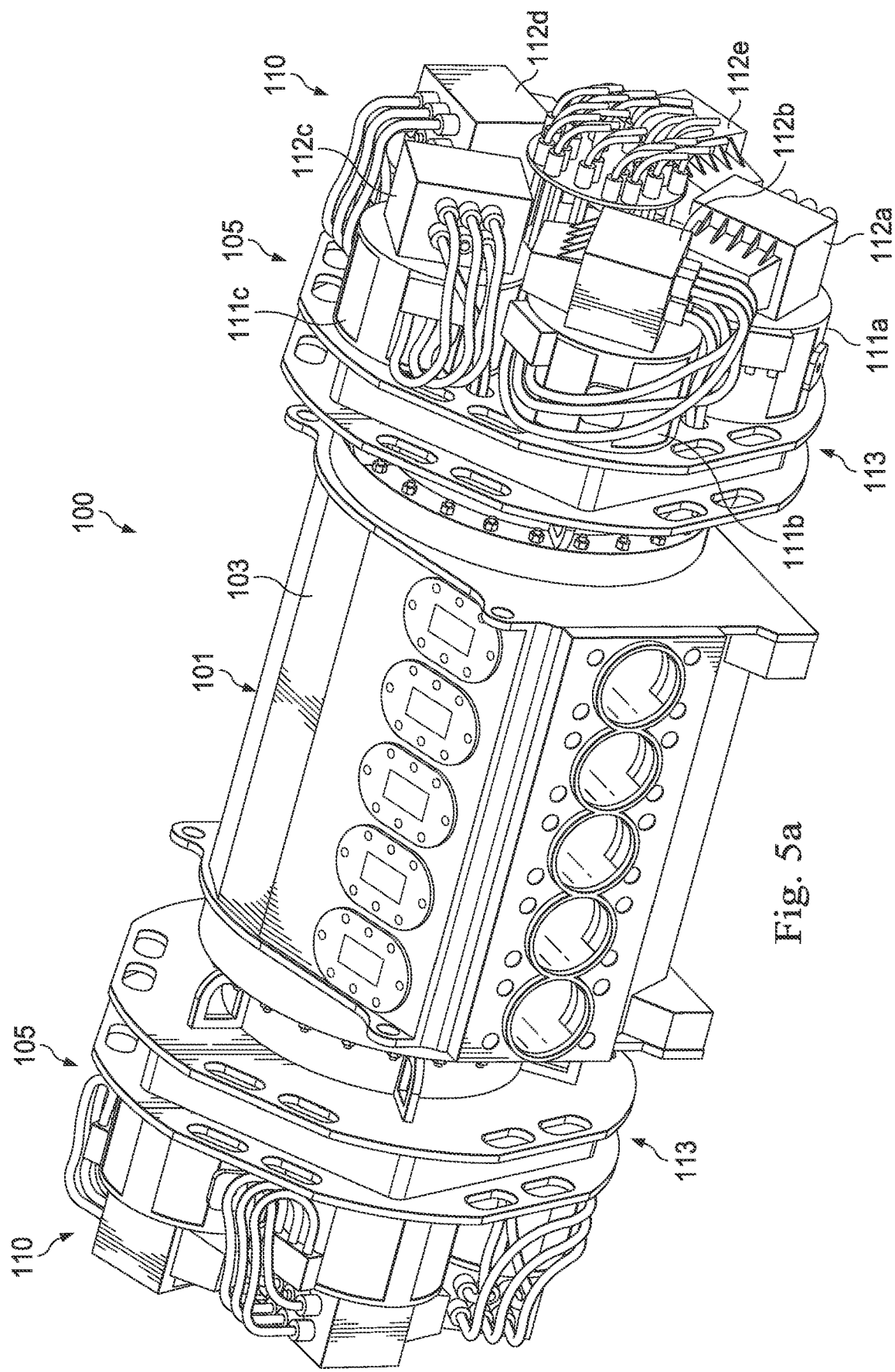
FIG. 5a is front perspective view of an electric hydraulic fracturing pump system according to embodiments of the present disclosure.
Figure 5B:
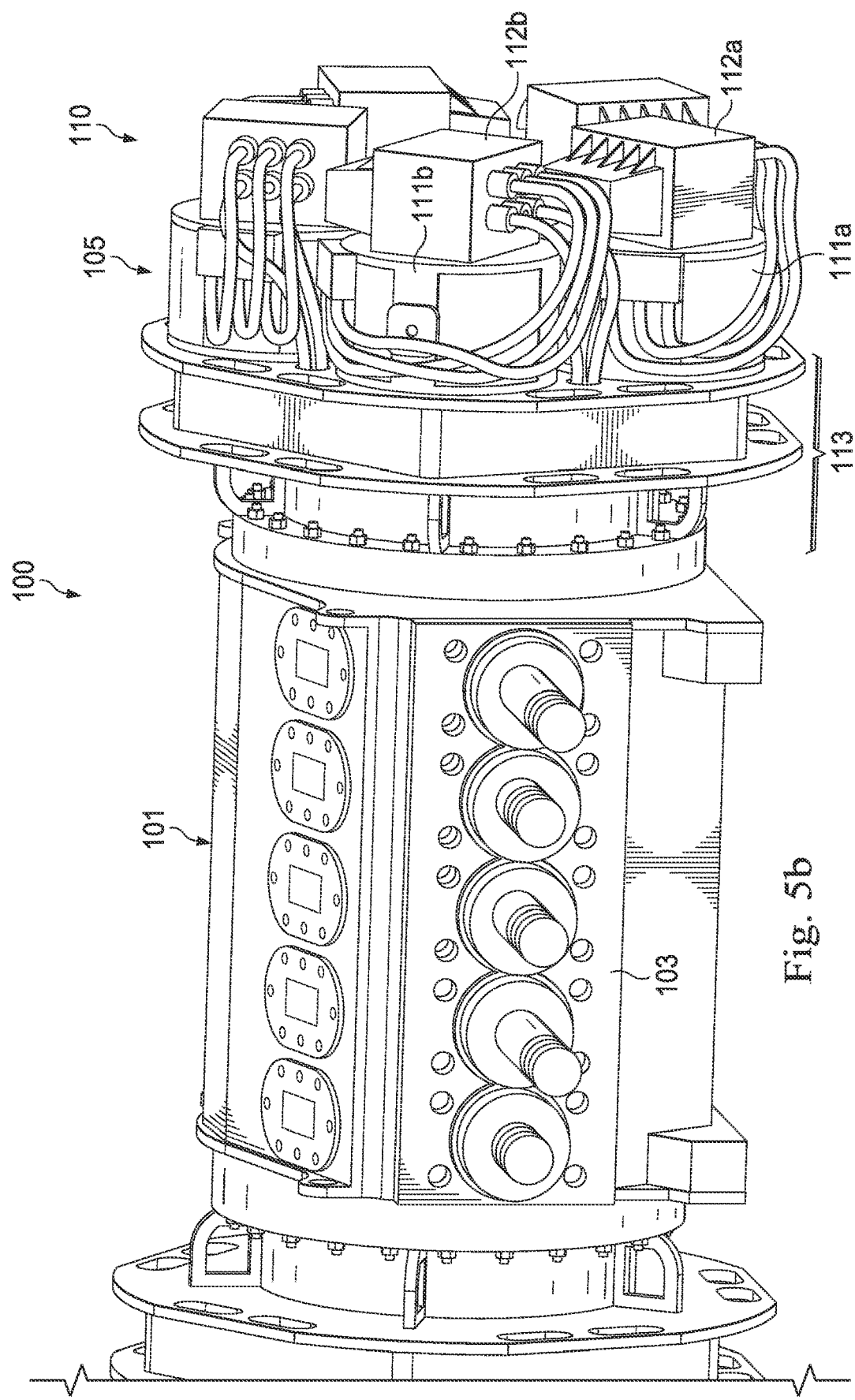
Figure 6B:
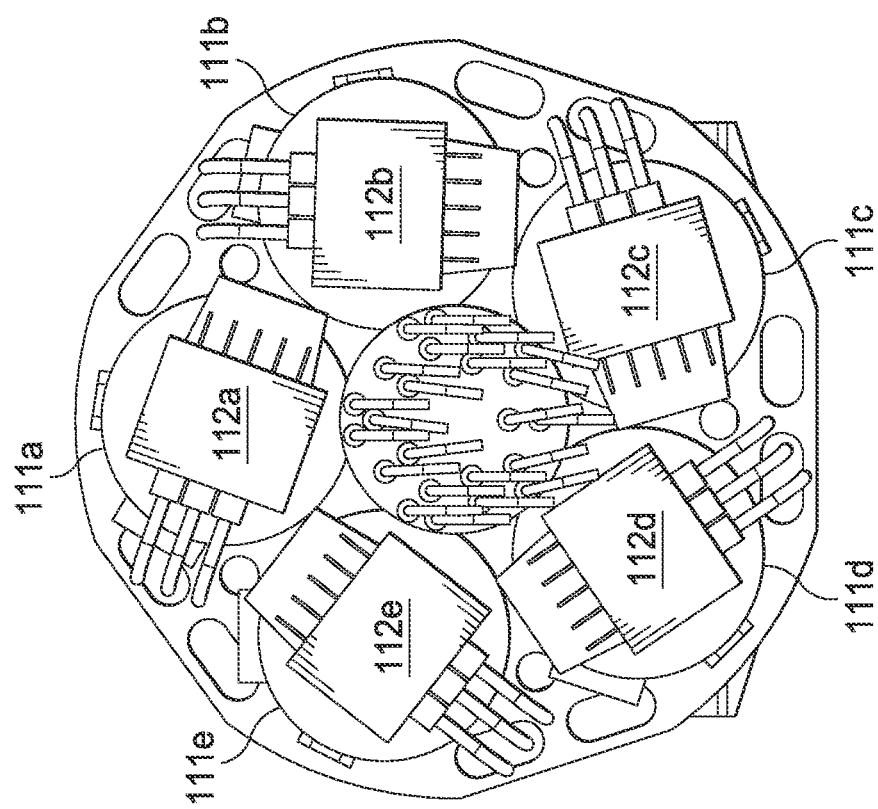
Figure 6A:
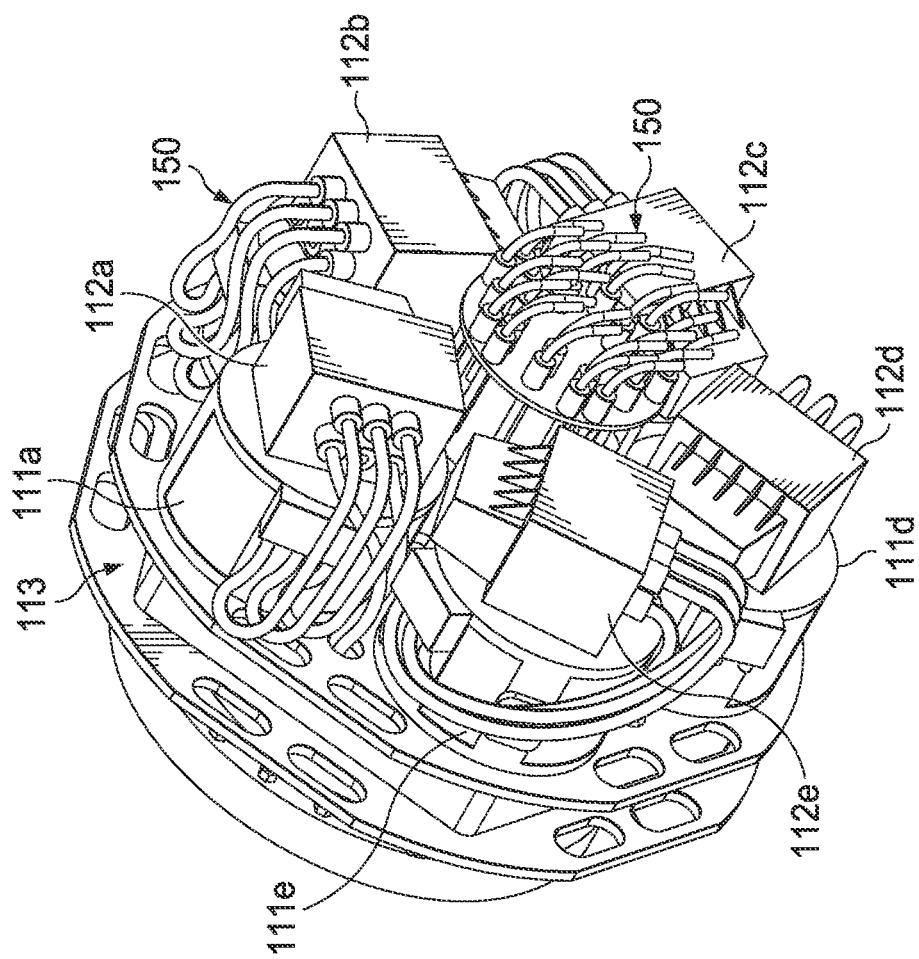
FIG. 6a is a perspective view of the electric motor and dual inverter arrangement of embodiments of an electric hydraulic fracturing pump system.
Figure 6C:
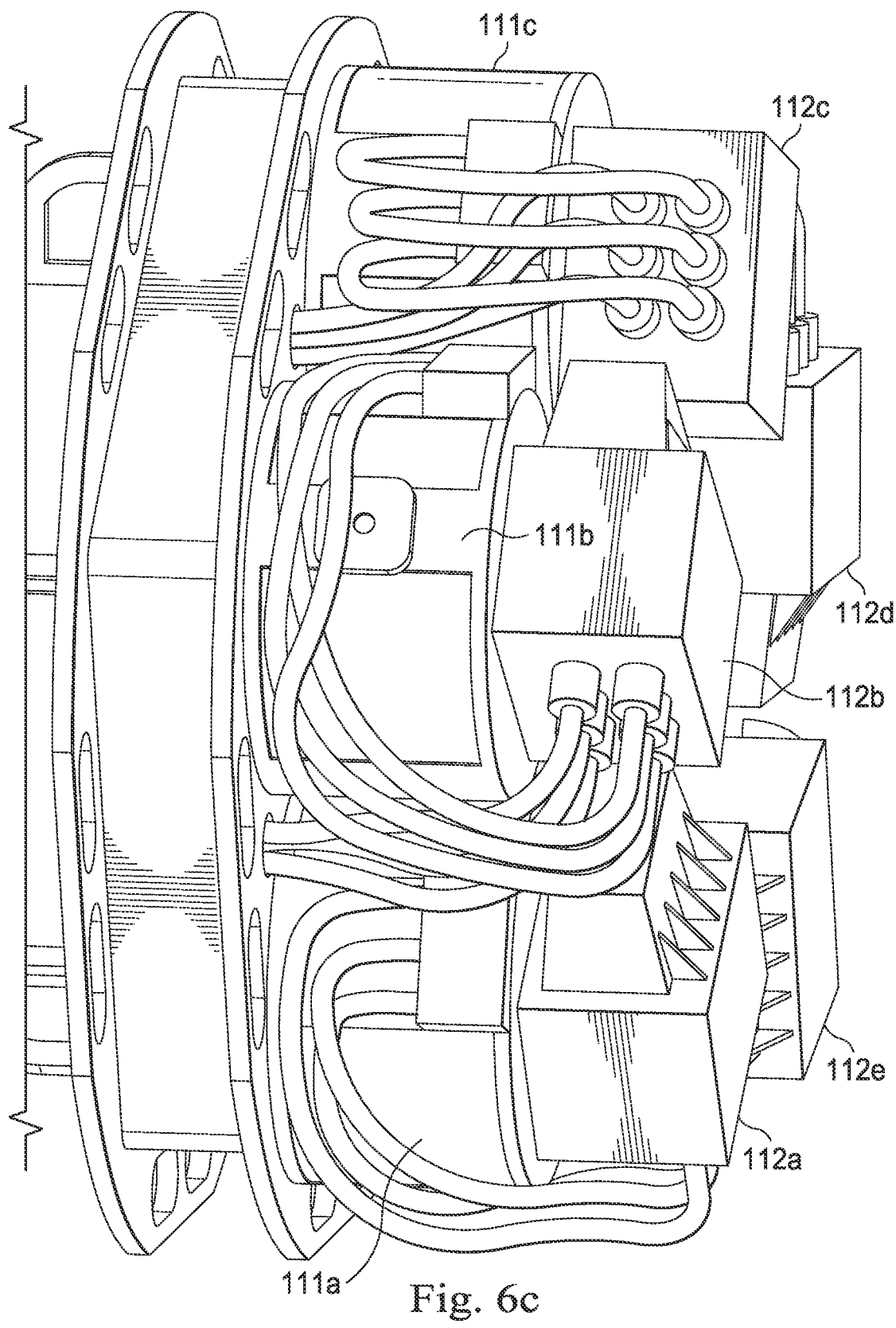

FIGS. 5a, 5b, 6a, 6b, and 6c provide various views of an electric drive hydraulic fracturing pump system 100 according to the present description. In FIGS. 5a and 5b, transmission assemblies 105 are disposed on opposing sides of power end 103 of the hydraulic fracking pump 101. In other embodiments, a single transmission assembly 105 may be employed. As shown, each transmission assembly 105 may be coupled to a dual inverter assembly 110. Referring to FIG. 6a, a plurality of communication lines 150 may be used to interconnect the various components of the electric drive hydraulic fracturing pump system 100, as described herein. The communication lines 150 may include electrical cables for carrying an electrical signal and/or hydraulic lines for carrying coolant through the first or second cooling systems 118, 120.

Thus, a hydraulic fracturing pump system has been described. The hydraulic fracturing pump system includes a hydraulic fracturing pump having a pump crankshaft; an electric drive motor coupled to the pump crankshaft; and an electric dual inverter electrically coupled to the electric drive motor. In other embodiments, the hydraulic fracturing pump system may include a hydraulic fracturing pump having a pump crankshaft; a planetary gearset having an input shaft and an output shaft, the output shaft coupled to the pump crankshaft; an electric drive motor coupled to the input shaft of the planetary gearset; and an electric dual inverter electrically coupled to the electric drive motor. In yet other embodiments, a hydraulic fracturing pump system may include a hydraulic fracturing pump having a pump crankshaft extending along a pump crankshaft axis; at least three electric drive motors coupled to the power input shaft, each drive motor having an output axis along which a drive motor output shaft extends, each of the three drive motors positioned about the pump crankshaft axis so that each drive motor output shaft is spaced apart from the from the pump crankshaft axis; and at least three electric dual inverters, each dual inverter electrically coupled to an electric drive motor. Still yet other hydraulic fracturing pump systems may include a hydraulic fracturing pump having a pump crankshaft extending along a pump crankshaft axis; at least three electric drive motors coupled to the pump crankshaft, each drive motor having an output axis along which a drive motor output shaft extends, each of the three drive motors positioned about the pump crankshaft axis so that each drive motor output shaft is spaced apart from the from the pump crankshaft axis and from each other; and at least three electric dual inverters, each dual inverter electrically coupled to a separate electric drive motor.

For any of the foregoing embodiments, the hydraulic fracturing pump system may include any one of the following elements, alone or in combination with any other elements:

At least five electric drive motors coupled to the pump crankshaft, each drive motor having an output axis along which a drive motor output shaft extends, each of the five drive motors positioned about the pump crankshaft axis so that each drive motor output shaft is spaced apart from the from the pump crankshaft axis; and at least five electric dual inverters, each dual inverter electrically coupled to an electric drive motor.

At least five electric drive motors coupled to the pump crankshaft, each drive motor having an output axis along which a drive motor output shaft extends, each of the five drive motors symmetrically positioned about the pump crankshaft axis so that each drive motor output shaft is spaced apart from the from the pump crankshaft axis and from each other; and at least five electric dual inverters, each dual inverter electrically coupled to a separate electric drive motor.

Each drive motor is symmetrically spaced about the pump crankshaft axis.

The hydraulic pump further comprises a pump crankcase from which the pump crankshaft extends, the hydraulic fracturing pump system further comprising a drive motor support housing attached to the pump crankcase.

The drive motor support housing is a gearbox.

A planetary gearset having an input shaft and an output shaft, the output shaft coupled to the pump crankshaft of the hydraulic fracturing pump and the input shaft coupled to a drive motor output shaft.

At least three planetary gearsets, each gearset having an input shaft and an output shaft, the output shaft coupled to the pump crankshaft of the hydraulic fracturing pump and each gearset input shaft coupled to a drive motor output shaft.

A separate planetary gearset engaging each drive motor, each gearset having an input shaft and an output shaft, the output shaft coupled to the pump crankshaft of the hydraulic fracturing pump and each gearset input shaft coupled to a drive motor output shaft.

The hydraulic fracturing pump further comprises a pump crankcase having a first end and a second end with a with a crankshaft extending between the two crankcase ends along a crankshaft axis, the crankshaft having a first end and a second end.

A separate electric drive motor coupled to each end of the pump crankshaft; and a separate electric dual inverter electrically coupled to each electric drive motor.

At least three planetary gearsets disposed at each end of the crankcase, each gearset having an input shaft and an output shaft, the output shaft coupled to the pump crankshaft end adjacent the planetary gearset, each gearset input shaft coupled to a drive motor output shaft.

At least three electric drive motors coupled to the pump crankshaft at each end of the crankcase, each drive motor having an output axis along which a drive motor output shaft extends, each of the three drive motors at each crankcase end symmetrically positioned about the pump crankshaft axis so that each drive motor output shaft is spaced apart from the from the pump crankshaft axis and from each other; and at least three electric dual inverters at each end of the crankcase, each dual inverter electrically coupled to a separate electric drive motor.

Each drive motor comprises a drive motor housing, and each drive motor housing has a dual inverter mounted thereon.

Each drive motor housing is substantially circular.

Each drive motor housing is substantially disk shaped.

Each dual inverter has a first alternating current input, a first high voltage output, a first high voltage input and an alternating current output.

A power source electrically coupled to the first alternating current input of the dual inverter.

The alternating current output of the dual inverter is electrically coupled to the electrical input of a drive motor.

The power source is a turbine electric generator.

An electric converter and a low voltage auxiliary electric device electrically coupled to the electric converter, wherein the high voltage output of the dual inverter is coupled to the electric converter.

The low voltage auxiliary electric device is a pump.

The low voltage auxiliary electric device is a cooling fan.

An electric inverter and a low voltage auxiliary device oil motor electrically coupled to the electric inverter, wherein the high voltage output of the dual inverter is coupled to the electric inverter.

A first cooling system having a first cooling fluid and a second cooling system having a second cooling fluid.

The first cooling system is fluidically coupled to a drive motor and the second cooling system is fluidically coupled to a dual inverter.

The first cooling fluid is oil and the second cooling fluid is a glycol and water mixture.

The first cooling system is fluidically coupled to each drive motor and the second cooling system is fluidically coupled to each dual inverter.

The motor has a cooling fluid inlet and a cooling fluid outlet

The dual inverter has a cooling fluid inlet and a cooling fluid outlet

A first fluid reservoir and a first fluid pump fluidically coupled thereto, wherein the cooling fluid inlet of the motor is fluidically coupled to the first fluid pump and the cooling fluid outlet of the motor is fluidically coupled to the first fluid reservoir.

A scavenger pump fluidically coupled between the cooling fluid outlet of the motor and the first fluid reservoir.

A second fluid reservoir and a second fluid pump fluidically coupled thereto, wherein the cooling fluid inlet of the dual inverter is fluidically coupled to the second fluid pump and the cooling fluid outlet of the dual inverter is fluidically coupled to the second fluid reservoir.

The electric inverter is fluidically coupled to the second reservoir.

The low voltage auxiliary device oil motor is fluidically coupled to the second reservoir.

Thus, a method for operating a hydraulic fracturing pump has been described. In one or more embodiments, the method generally incudes utilizing a first dual inverter to supply electrical current to a first electric motor; energizing a first electric motor to initiate rotation of hydraulic fracturing pump crankshaft; and thereafter utilizing a second dual inverter to supply electrical current to a second electric motor; and energizing the second electric motor to provide power to the pump crankshaft. In other embodiments, the method includes energizing a first electric motor to initiate rotation of hydraulic fracturing pump crankshaft; and utilizing a dual inverter to dynamically control the electric motor to adjust power to the pump crankshaft. In other embodiments, the method includes energizing a plurality of electric motors to rotate a hydraulic fracturing pump crankshaft; and utilizing a plurality of dual inverters to separately control the electric motors to adjust power to the pump crankshaft. In other embodiments, the method may include utilizing a first dual inverter to energize a first electric motor to initiate rotation of hydraulic fracturing pump crankshaft; and thereafter utilizing a second dual inverter and a third dual inverter to energizing at least a second electric motor and a third electric motor, respectively, to provide power to the pump crankshaft.

For the foregoing embodiments, the method may include any one of the following steps, alone or in combination with each other:

Measuring a condition of the hydraulic fracturing pump and based on the measured condition, energizing at least a second electric motor and a third electric motor to provide power to the pump crankshaft.

Measuring a condition of the hydraulic fracturing pump and based on the measured condition, energizing at least a fourth electric motor and a fifth electric motor to provide power to the pump crankshaft.

Measuring a condition of the hydraulic fracturing pump and based on the measured condition, dynamically controlling a plurality of electric motors to adjust power to the pump crankshaft.

Dynamically controlling a plurality of electric motors to adjust power to the pump crankshaft.

Separately controlling a plurality of electric motors to adjust power to the pump crankshaft.

Rectifying an input alternating current from a power source to a high voltage direct current; and thereafter, reducing the average power delivered by high voltage direct current through pulse width modulation to generate a pulse width modulation signal; and energizing the first electric motor utilizing the pulse width modulation signal.

Utilizing a power source to provide an alternating current to a hydraulic fracturing pump system; rectifying the alternating current to a high voltage direct current; and thereafter, reducing the average power delivered by high voltage direct current through pulse width modulation to generate a pulse width modulation signal; and energizing the first electric motor utilizing the pulse width modulation signal.

Utilizing a power source to provide an alternating current to a hydraulic fracturing pump system having a plurality of electric motors; separately for each electric motor, (i) rectifying the alternating current to a high voltage direct current; (ii) reducing the average power delivered by high voltage direct current through pulse width modulation to generate a pulse width modulation signal; and (iii) energizing the electric motor utilizing the pulse width modulation signal.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

What is claimed is:

1. A method for operating a hydraulic fracturing pump comprising:
    energizing a first electric drive motor to initiate rotation of hydraulic fracturing pump crankshaft;
    thereafter energizing a plurality of separate electric drive motors to provide additional power to the pump crankshaft;
    individually controlling each of the plurality of electric drive motors separate from each of the other electric drive motors to adjust power to the pump crankshaft, wherein individually controlling comprises:
    utilizing a power source to provide an alternating current to a hydraulic fracturing pump system;
    and individually for each separate electric drive motor, (i) rectifying the alternating current to a high voltage direct current; (ii) reducing the average power delivered by high voltage direct current through pulse width modulation to generate a pulse width modulation signal; and (iii) powering the electric drive motor utilizing the pulse width modulation signal.

2. The method of claim 1, further comprising:
    measuring a condition of the hydraulic fracturing pump; and
    based on the measured condition, dynamically controlling and powering each of the plurality of electric drive motors individually with a separate electric dual inverter to adjust power to the pump crankshaft.

3. A method for operating a hydraulic fracturing pump comprising:
    energizing a first electric drive motor to initiate rotation of hydraulic fracturing pump crankshaft;
    dynamically controlling a plurality of electric drive motors to adjust power to the pump crankshaft;
    utilizing a power source to provide an alternating current to the hydraulic fracturing pump system having a plurality of electric drive motors and a plurality of electric dual inverters;
    separately for each electric drive motor controlling operation of the electric drive motor utilizing a separate electric dual inverter by (i) rectifying the alternating current to a high voltage direct current; (ii) reducing the average power delivered by high voltage direct current through pulse width modulation to generate a pulse width modulation signal; and (iii) powering the electric drive motor utilizing the pulse width modulation signal.

4. The method of claim 3, further comprising:
    measuring a condition of the hydraulic fracturing pump; and
    based on the measured condition, energizing at least a second electric drive motor and a third electric drive motor to provide power to the pump crankshaft.

5. The method of claim 4, further comprising:
    measuring a condition of the hydraulic fracturing pump; and
    based on the measured condition, energizing at least a fourth electric drive motor and a fifth electric drive motor to provide power to the pump crankshaft.

6. The method of claim 3, further comprising:
    separately and individually powering and controlling each of the plurality of electric drive motors to adjust power to the pump crankshaft.

* * * * *